United States Patent
Wasif et al.

(10) Patent No.: US 9,038,393 B2
(45) Date of Patent: May 26, 2015

(54) FUEL GAS COOLING SYSTEM FOR COMBUSTION BASKET SPRING CLIP SEAL SUPPORT

(75) Inventors: Samer P. Wasif, Oviedo, FL (US); Muzaffer Sutcu, Oviedo, FL (US); Walter R. Laster, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 1264 days.

(21) Appl. No.: 12/870,054

(22) Filed: Aug. 27, 2010

(65) Prior Publication Data
US 2012/0047904 A1    Mar. 1, 2012

(51) Int. Cl.
*F02C 1/00*    (2006.01)
*F02C 3/14*    (2006.01)
*F02C 7/28*    (2006.01)

(52) U.S. Cl.
CPC .... *F02C 3/14* (2013.01); *F02C 7/28* (2013.01)

(58) Field of Classification Search
CPC .......... F02C 3/14; F02C 7/38; F05D 2240/57; F23R 3/002; F23R 3/04; F23R 3/28; F23R 3/283; F23R 3/34; F23R 3/346; F23R 3/60; F23R 2900/00012; F01D 9/023
USPC .......................... 60/752, 760, 796, 39.37, 782
See application file for complete search history.

(56) References Cited

U.S. PATENT DOCUMENTS

| 4,012,902 | A | 3/1977 | Schirmer |
| 4,695,247 | A | 9/1987 | Enzaki et al. |
| 5,012,645 | A | 5/1991 | Reynolds |
| 5,117,637 | A | 6/1992 | Howell et al. |
| 5,201,846 | A | 4/1993 | Sweeney |
| 5,323,601 | A | 6/1994 | Jarrell et al. |
| 5,396,759 | A | 3/1995 | Richardson |
| 5,918,467 | A | 7/1999 | Kwan |
| 5,924,288 | A | 7/1999 | Fortuna et al. |
| 7,093,439 | B2 | 8/2006 | Pacheco-Tougas et al. |
| 7,146,815 | B2 | 12/2006 | Burd |
| 7,464,554 | B2 | 12/2008 | Cheung et al. |
| 7,509,813 | B2 | 3/2009 | Stastny |
| 2007/0258808 | A1* | 11/2007 | Ohri et al. ..................... 415/139 |
| 2010/0018210 | A1* | 1/2010 | Fox et al. ......................... 60/746 |
| 2010/0071376 | A1* | 3/2010 | Wiebe et al. .................... 60/740 |

* cited by examiner

*Primary Examiner* — Devon Kramer
*Assistant Examiner* — Vikansha Dwivedi

(57) ABSTRACT

A fuel gas cooling system for a combustion basket spring clip seal support is disclosed. The fuel gas cooling system may be formed from one or more fuel gas supply channels terminating proximate to a spring clip at the intersection between a combustor basket and a transition section such that fuel gas may be supplied to the hot gas path proximate to the intersection between the combustor basket and the transition section. The fuel gas supply channel may create an intermediate fuel gas burn at this intersection, which may reduce the firing temperature at the fuel nozzles and reduce NOx emissions.

18 Claims, 7 Drawing Sheets

FUEL GAS COOLING SYSTEM FOR COMBUSTION BASKET SPRING CLIP SEAL SUPPORT

FIELD OF THE INVENTION

The present invention relates in general to sealing systems and, more particularly, to a cooling system for turbine spring clip seals that direct gases to mix with fuel in a combustor basket in a turbine engine.

BACKGROUND OF THE INVENTION

There exists a plethora of variables that affect performance of a turbine engine. One such variable that has been identified in dry-low NOx (DLN) combustor design turbines is the air flow distribution between the combustor zone and the leakage air flows. Typically, a spring clip seal is used in such a turbine engine to direct gases, such as common air, into a combustor basket where the air mixes with fuel. Conventional spring clip seals direct air through center apertures in the seals and are formed from outer and inner housings. The seals are generally cylindrical cones that taper from a first diameter to a second, smaller diameter. The first diameter is often placed in contact with a transition inlet ring, and the second, smaller diameter is often fixedly attached to a combustor basket. The inner and outer housings include a plurality of slots around the perimeter of the housings which form leaves in the housing. In at least one conventional embodiment, twenty slots are positioned generally equidistant to each other at the perimeter of the housing. The leaves are capable of flexing and thereby imparting spring properties to the spring clip seal. This spring force assists in at least partially sealing the inner housing to the outer housing.

Conventional spring clips allow up to eight percent of the total air flow distribution flowing through a center aperture of a spring clip seal to leak through the seal. Such leakage can often cause undesirable outcomes. For instance, air leakage at this level can cause high engine performance variability, which is characterized by high NOx emissions, high dynamics or flashback, or any combination thereof. Therefore, there exists a need for an improved system.

SUMMARY OF THE INVENTION

Set forth below is a brief summary of the invention that solves the foregoing problems and provides benefits and advantages in accordance with the purposes of the present invention as embodied and broadly described herein. This invention is directed to a fuel gas cooling system for a combustion basket spring clip seal support. The fuel gas cooling system may be formed from one or more fuel gas supply channels terminating proximate to a spring clip at the intersection between a combustor basket and a transition section such that fuel gas may be supplied to the hot gas path proximate to an intersection between the combustor basket and the transition section. The fuel gas supply channel may create an intermediate fuel gas burn, which may reduce the firing temperature at the fuel nozzles and reduce NOx emissions. In at least one embodiment, about one percent of the total air flow supplied from the compressor (not shown) of the turbine engine is used to cool the spring clips. Use of the fuel gas cooling system can reduce the firing temperature by about 13 degrees at the firing nozzles and can reduce NOx emissions by about three ppm.

The fuel gas cooling system may include one or more outer housings forming a combustor basket. One or more transition sections may extend from a downstream, terminal end of the combustor basket. A transition section upstream end may be positioned upstream from the downstream, terminal end of the combustor basket such that at least a portion of the transition section overlaps the combustor basket. One or more spring clips may be positioned between the combustor basket and the transition section such that the spring clip seals at least a portion of a gap between the combustor basket and the transition section. The spring clip may extend circumferentially around the terminal end of the combustor basket. One or more fuel gas supply channels may have one or more exhaust orifices proximate to the terminal end of the combustor basket.

One or more fuel gas plenums may be coupled to the fuel gas supply channel for supplying fuel gas to the fuel gas supply channel. In at least one embodiment, the fuel gas plenum may be a circumferential plenum upstream from the supply channel. The fuel gas plenum may be an axially extending plenum positioned radially between the spring clip and the combustor basket.

The fuel gas cooling system may also include a fuel gas supply conduit in fluid communication with the fuel gas plenum and upstream of the fuel gas plenum for supplying fuel to the fuel gas plenum. The fuel gas supply conduit may extend from a fuel delivery system and may be attached to a cover plate.

The fuel gas cooling system may also include one or more cooling fluid supply channels that may have one or more exhaust orifices proximate to the terminal end of the combustor basket for supplying air to cool aspects of the combustor bracket and the transition section and for combustion of the fuel gas. The cooling fluid supply channel and the fuel gas supply channel may each include a plurality of channels positioned such that the channels are positioned circumferentially in alternating order around the terminal end of the combustor basket and extend axially.

The fuel gas cooling system may also include one or more air orifices in a wall forming the fuel gas supply channel for supplying air to the fuel gas flowing through the fuel gas supply channel. In one embodiment, the air orifice may be a plurality of air orifices positioned in a wall of the fuel gas supply channel, wherein the fuel gas supply channel may be an axially extending plenum positioned radially between the spring clip and the combustor basket. The fuel gas cooling system may also include one or more metered cooling orifices supplying cooling air immediately downstream of the exhaust outlet of the fuel gas supply channel to control combustion of the fuel gas.

A hot gas path system that may include aspects of the fuel gas cooling system is disclosed. The hot gas path system may include one or more outer housings forming a combustor basket and one or more transition sections that extend from a position downstream of a terminal end of the combustor basket and has an inner surface generally aligned with an inner surface of the combustor basket. The hot gas path system may include a stepped inlet ring coupled to the transition section and may extend upstream from the transition section. An upstream end of the stepped inlet ring may be positioned radially outward from the combustor basket such that at least a portion of the stepped inlet ring axially overlaps a portion of the combustor basket. The stepped inlet ring may be formed from a radially extending, generally cylindrical collar coupled to an axially extending cylindrical wall. One or more spring clips may be positioned between the combustor basket and the stepped inlet ring such that the spring clip seals at least a portion of a circumferential gap between the combustor basket and the stepped inlet ring.

The hot gas path system may include one or more heat shields positioned downstream from a combustor basket and proximate to an intersection between the collar and the axially extending cylindrical wall. The heat shield may contact the collar and may contact the axially extending cylindrical wall of the stepped inlet ring. The heat shield may be formed from a ring. The heat shield may include a connection system. One embodiment of the connection system may be a plurality of studs extending from a downstream side of the heat shield that are in contact with the axially extending cylindrical wall. The studs may extend through the stepped inlet ring. One or more of the studs may have an orifice extending therethrough, wherein a bolt may extend through the orifice and have a nut attached to the bolt. The connection system may also be formed from one or more stops attached to the collar and extending radially inward therefrom such that an upstream edge of the heat shield contacts the stop. One or more metered cooling orifices in the at least one heat shield may supply cooling air immediately downstream of the combustor basket. The heat shield may include one or more thermal barrier coatings.

In another embodiment, the fuel gas cooling system may also include one or more heat shields positioned downstream from the exhaust outlet of the fuel gas supply channel such that the heat shield modifies combustion at the exhaust outlet. In one embodiment, the heat shield may include one or more metered cooling orifices in the heat shield supplying cooling air immediately downstream of the exhaust outlet of the fuel gas supply channel.

An advantage of this invention is that the fuel gas supply channels enhance the cooling effectiveness of the turbine engine cool system.

Another advantage of this invention is that the introduction of fuel at an intermediate axial stage dampens combustion harmonics.

Yet another advantage of this invention is that spring clip air leakage may be used to burn additional gas fuel, thereby reducing flame temperature near the fuel nozzles and reducing NOx emissions.

Another advantage is that the stepped inlet ring enables the inner surface of the transition section to be aligned with the inner surface of the combustor basket.

Still another advantage of this invention is that the heat shield is removable and replaceable by removing the combustor basket and without having to remove the transition.

Another advantage of this invention is that the heat shield improves the burn dynamics downstream of the fuel gas exhaust.

These and other advantages and objects will become apparent upon review of the detailed description of the invention set forth below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
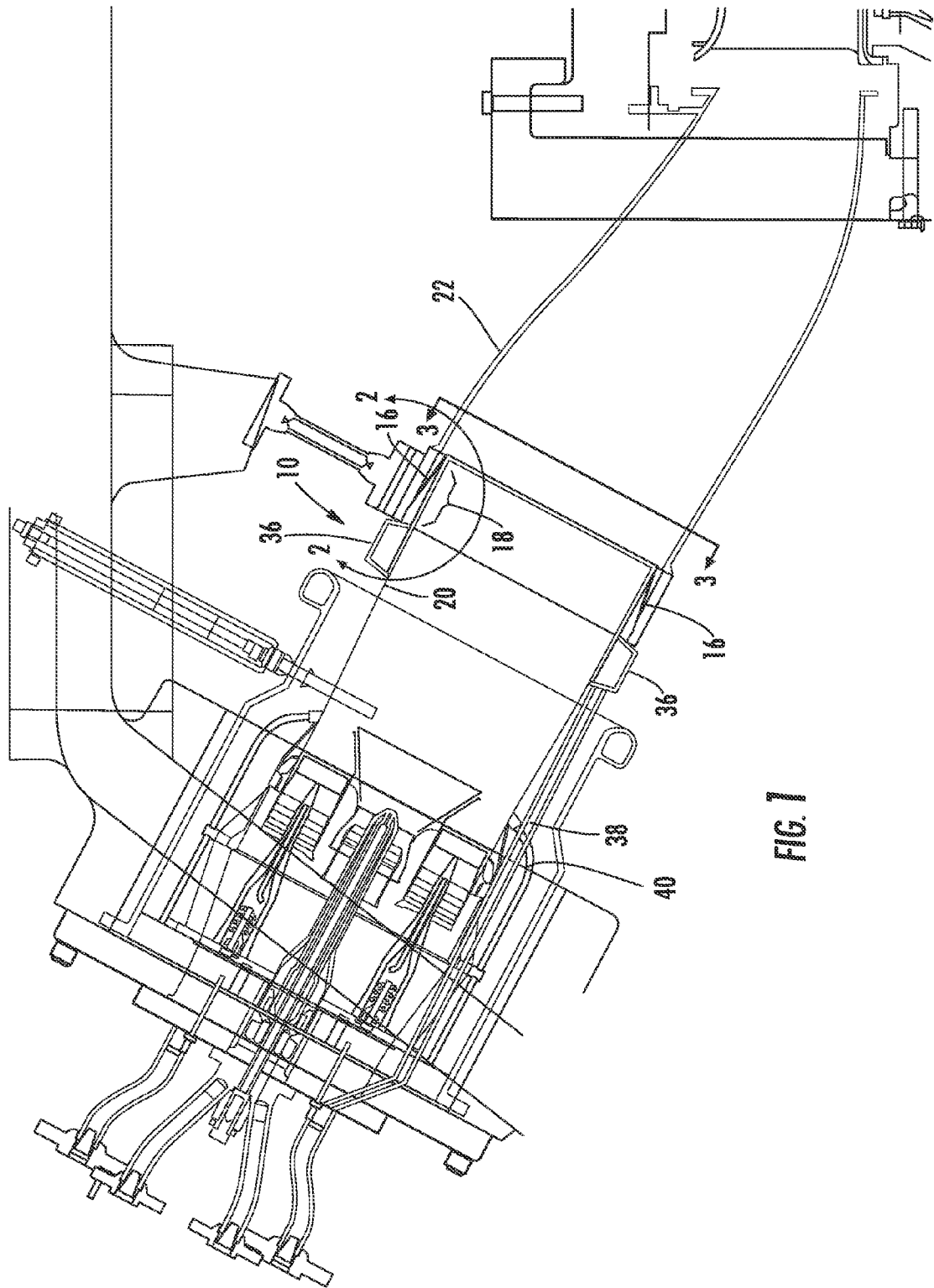
FIG. 1 is cross-sectional side view of a turbine engine combustor subsystem showing a turbine spring clip seal forming a connection between a combustor basket and a transition section.

As shown in FIGS. 1-7, this invention is directed to a fuel gas cooling system 10 for a combustion basket spring clip seal support 12. The fuel gas cooling system 10 may be formed from one or more fuel gas supply channels 14 terminating proximate to a spring clip 16 at an intersection 18 between a combustor basket 20 and a transition section 22 such that fuel gas may be supplied to the hot gas path proximate to the intersection 18. The fuel gas supply channel 14 may create an intermediate fuel gas burn at this intersection 18, which may reduce the firing temperature at fuel nozzles and reduce NOx emissions. In at least one embodiment, about one percent of the total air flow supplied from the compressor (not shown) of the turbine engine is used to cool the spring clips 16. Use of the fuel gas cooling system 10 can reduce the firing temperature by about 13 degrees at the firing nozzles and can reduce NOx emissions by about three ppm.

Figure 2:
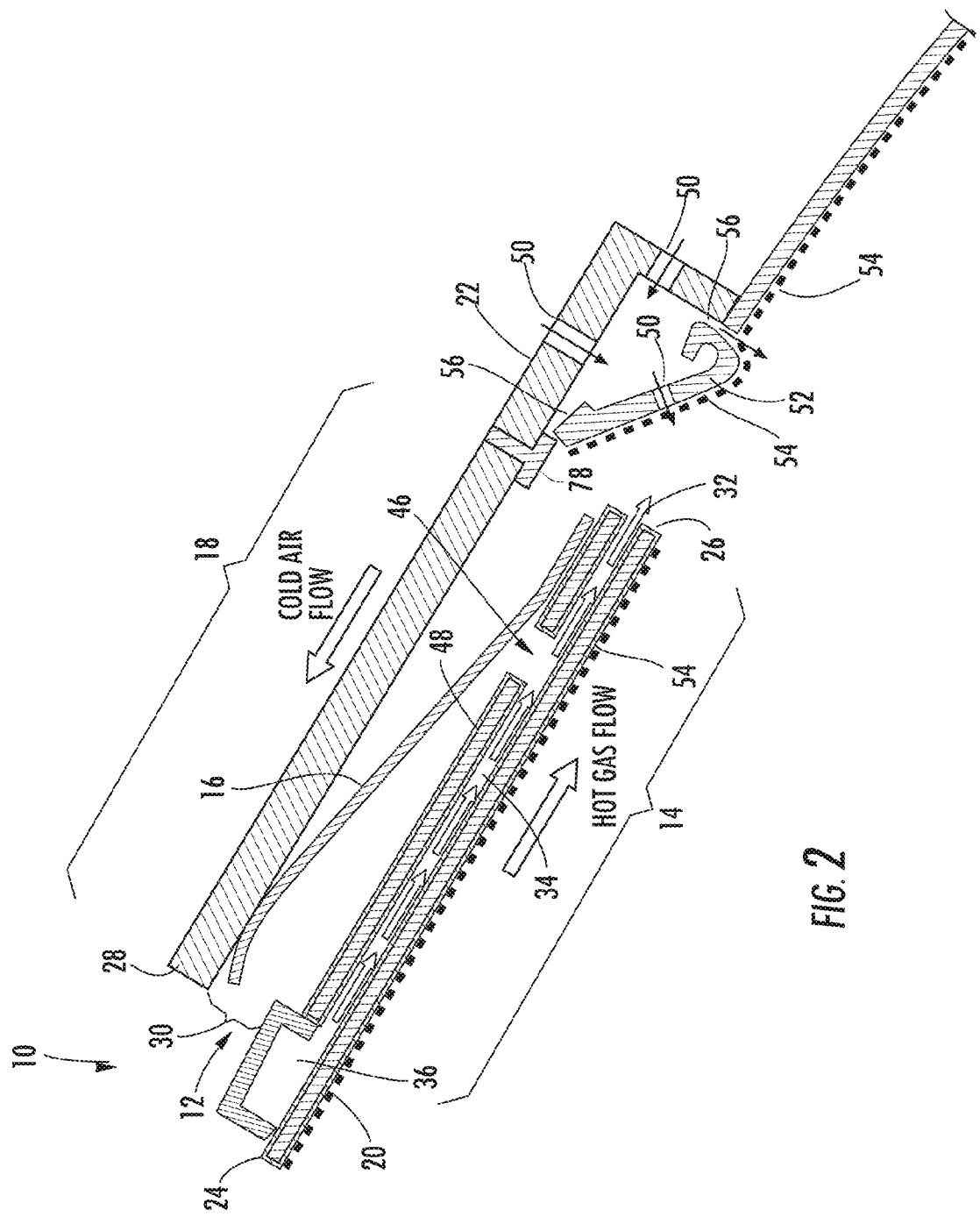
FIG. 2 is a detailed, cross-sectional side view of the turbine spring clip seal with a fuel gas channel and fuel gas plenum shown in FIG. 1 at detail 2-2.
Figure 4:
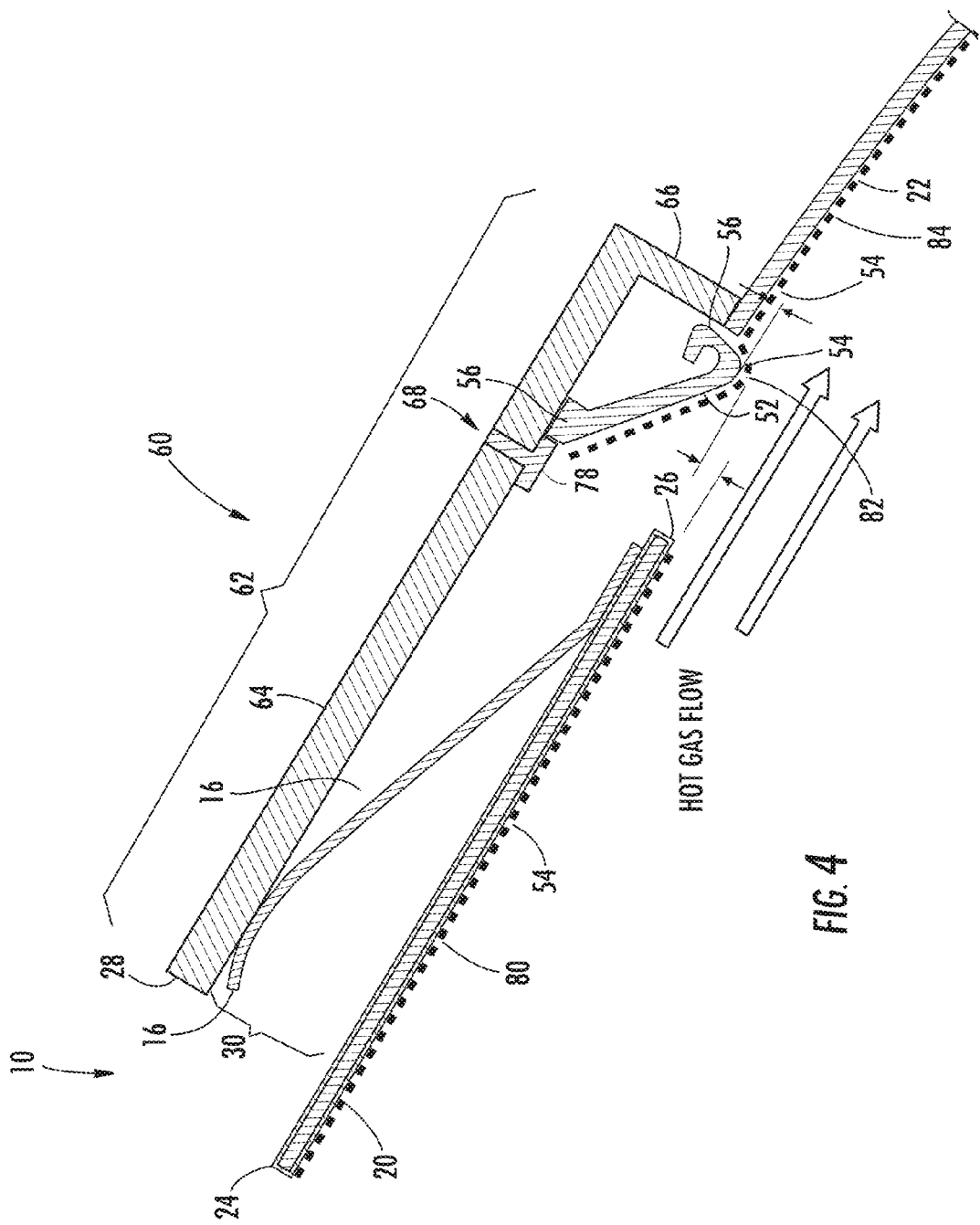
FIG. 4 is another embodiment of the detailed, cross-sectional side view of FIG. 2.
Figure 5:
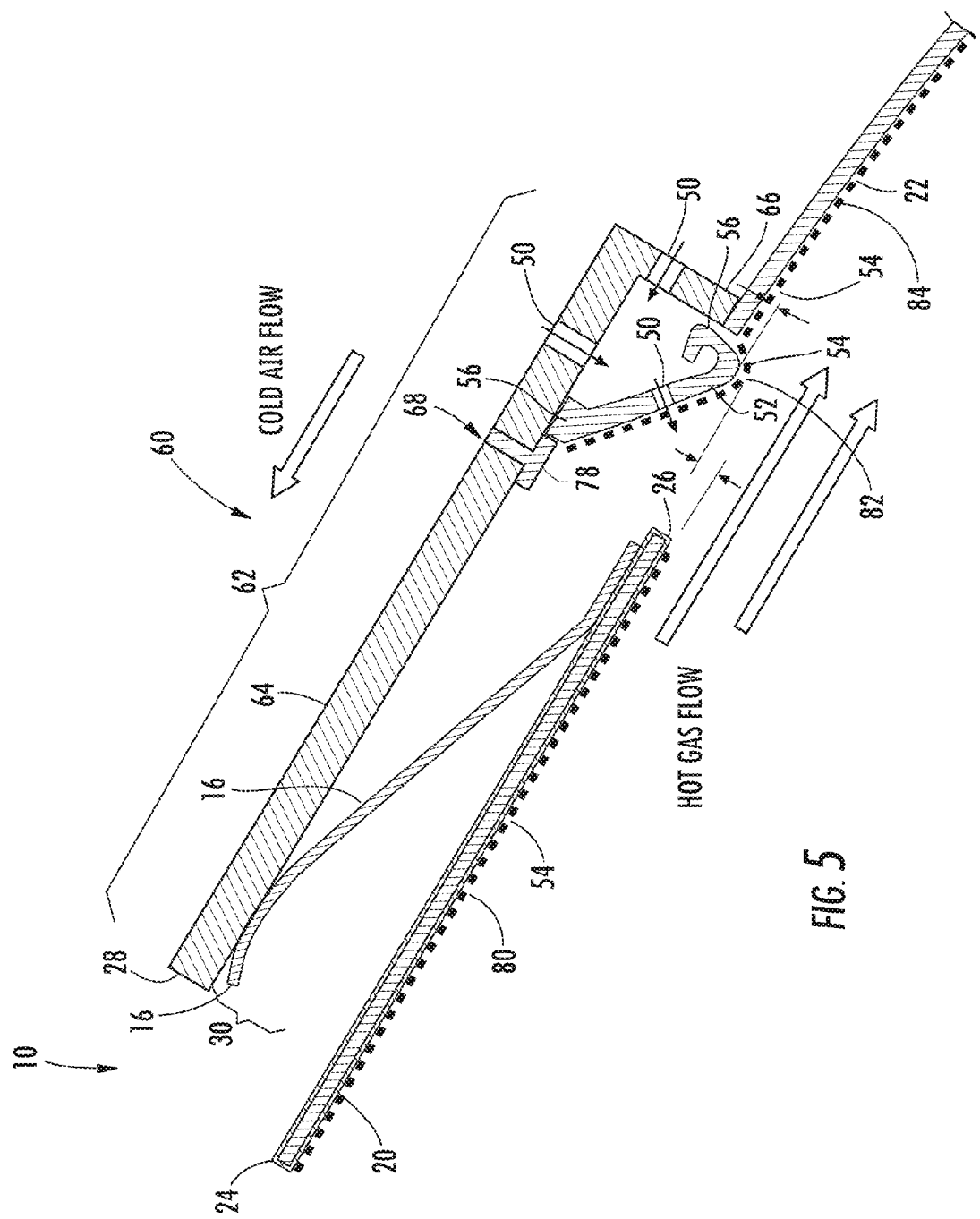
FIG. 5 is still another embodiment of the detailed, cross-sectional side view of FIG. 2.
Figure 6:
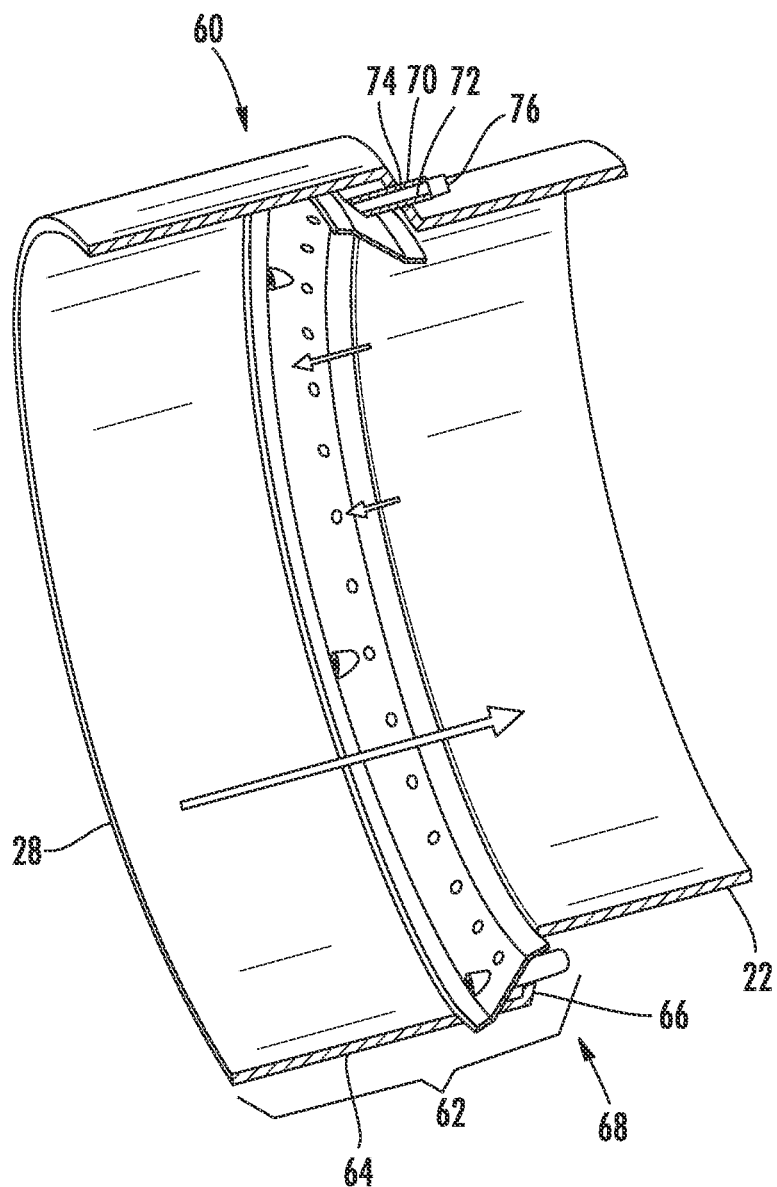
FIG. 6 is cross-sectional view of a hot gas path system described herein.
Figure 7:
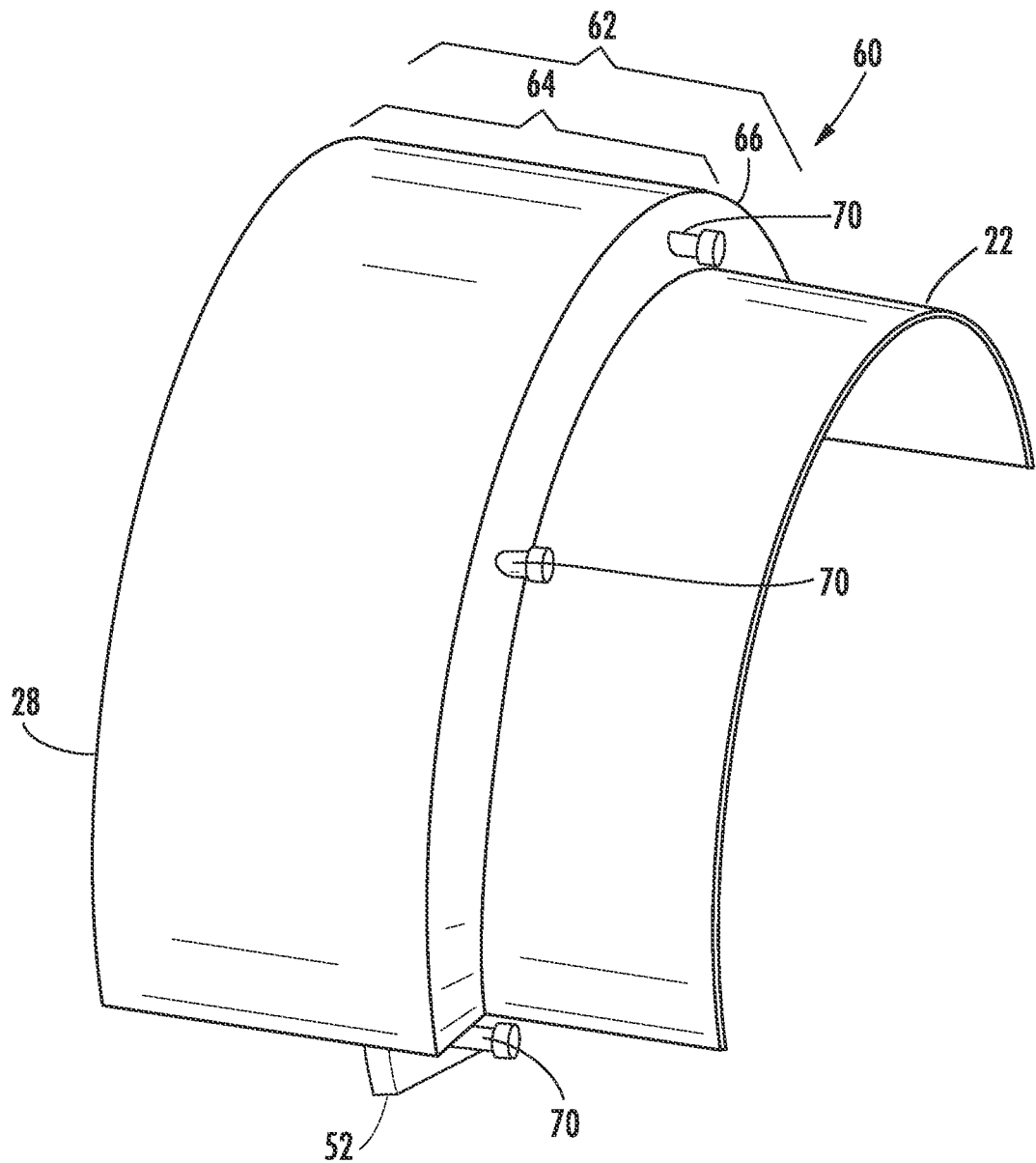
FIG. 7 is another cross-sectional view of a hot gas path system described herein.

As shown in FIGS. 2, 4 and 5, the fuel gas cooling system 10 may be formed from one or more outer housings 24 forming a combustor basket 20. One or more transition sections 22 may extend from a downstream, terminal end 26 of the combustor basket 20. A transition section upstream end 28 may be positioned upstream from the downstream, terminal end 26 of the combustor basket 20 such that at least a portion of the transition section 22 overlaps the combustor basket 20. The transition section 22 may be sized larger than the combustor basket 20 at the terminal end 26 such that at the intersection 18 between the combustor basket 20 and the transition section 22, the transition section 22 is positioned radially outward from the combustor basket 20.

One or more spring clips 16 may be positioned between the combustor basket 20 and the transition section 22 such that the spring clip 16 seals at least a portion of a gap 30 between the combustor basket 20 and the transition section 22. The spring clip seal 16 may be any appropriate shape, such as, but not limited to, generally cylindrical or a ring-shaped assembly. The spring clip seal 16 may be usable in turbine engines to direct gases to mix with fuel flowing into a conventional combustor basket 20. The spring clip seal 16 minimizes the leakage of cooling air into the hot gas path. A small amount of leakage is necessary to prevent flame holding regions at the exit of the combustor basket 20.

The fuel gas cooling system 10 may include one or more fuel gas supply channels 14 for supplying fuel gas in the region at the intersection 18 between the combustor basket 20 and the transition section 22. The fuel gas supply channel 14 may include one or more exhaust outlets 32 proximate to the terminal end 26 of the combustor basket 20. In at least one embodiment, the fuel gas supply channel 14 may include an axially extending plenum 34 positioned radially between the spring clip 16 and the combustor basket 20. The fuel gas supply channel 14 may be formed with a wall 48 attached on a radially outward side of the combustor basket 20 at a terminal end 26.

The fuel gas supply channel 14 may be supplied with fuel gas through one or more fuel gas plenums 36 coupled to the fuel gas channel 14. In at least one embodiment, the fuel gas plenum 36 may be a generally circumferential plenum. The fuel gas plenum 36 may extend partially or completely around the combustor basket 20. The fuel gas plenum 36 may be attached to the combustor basket 20 proximate to the intersection 18 between the combustor basket 20 and the transition section 22. The fuel gas plenum 36 may have any appropriate size and shape.

A fuel gas supply conduit 38 may be in fluid communication with the fuel gas plenum 36. The fuel gas supply conduit 38 may extend from any appropriate fuel source or fuel delivery system and may be coupled to the fuel gas plenum 36. In at least one embodiment, the fuel gas supply conduit 38 may be attached to a cover plate 40:

Fuel gas may be supplied to the fuel gas supply conduit 38, the fuel gas plenum 36 and the fuel gas supply channel 14. The supply of fuel gas may be controlled by one or more systems. The supply of fuel gas may be staged separately from other fuel stages of the turbine engine or may be controlled together with one or more other fuel stages. The supply of fuel gas may be based upon criteria already known or hereafter developed.

Figure 3:
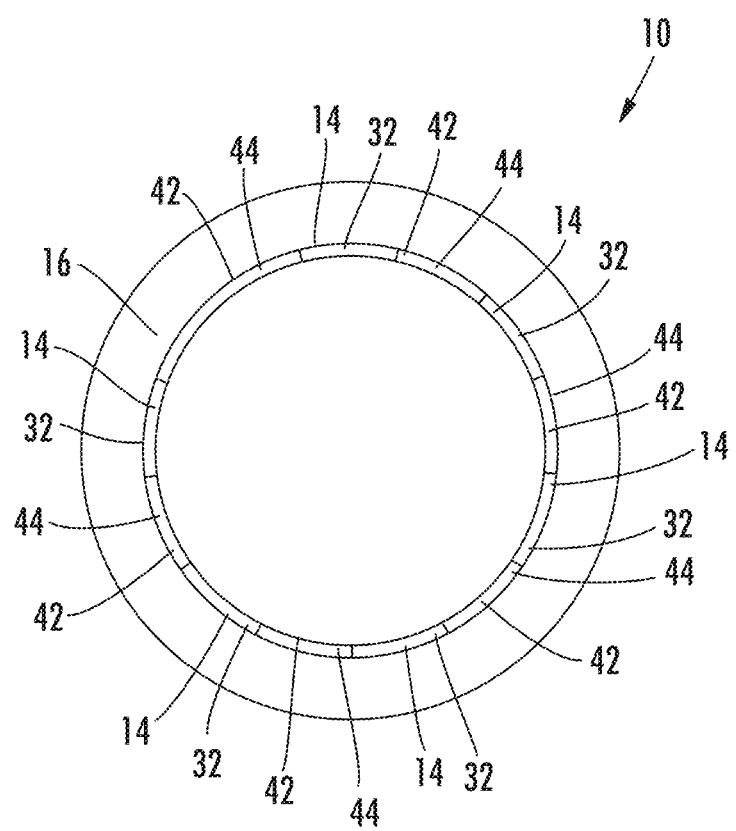
FIG. 3 is a partial cross-sectional view of a turbine spring clip seal with alternating fuel gas and cooling air supply channels taken along section line 3-3 in FIG. 1.

In another embodiment, the fuel gas cooling system 10 may include one or more cooling fluid supply channels 42 having at least one exhaust orifice 44 proximate to the terminal end 26 of the combustor basket 20 to supply cooling air. The cooling fluid channel 42 may be in fluid communication with one or more cooling fluid supplies, such as, but not limited to, conduits supplying air from the compressor. In at least one embodiment, the cooling fluid may be, but is not limited to, air. In one embodiment, as shown in FIG. 3, the fuel gas cooling system 10 may include both one or more fuel gas supply channels 14 and one or more cooling fluid supply channels 42. The fuel gas supply channels 14 and the cooling fluid supply channels 42 may extend generally axially and may be positioned in alternating order or other configuration around the terminal end 26 of the combustor basket.

As shown in FIG. 2, the fuel gas cooling system 10 may include one or more air orifices 46 in a wall 48 forming the fuel gas supply channel 14 for supplying air to the fuel gas flowing through the fuel gas supply channel 14. In at least one embodiment, the fuel gas cooling system 10 may include a plurality of air orifices 46. The number, size and placement of the air orifices 46 may be determined based upon the firing characteristic desired.

The fuel gas cooling system 10 may also include one or more metered cooling orifices 50 supplying cooling air immediately downstream of an exhaust outlet 32 of the fuel gas supply channel 14. The number and size of the metered cooling orifices 50 may be determined based upon the desired firing characteristics at the exhaust outlet 32 of the fuel gas supply channel 14.

A hot gas path system 60, as shown in FIGS. 4-7, in which the fuel gas system 10 may be incorporated, is disclosed. The hot gas path system 60 may include a stepped inlet ring 62 coupled to the transition section 22 and extending upstream from the transition section 22. An upstream end 28 of the stepped inlet ring 62 may be positioned radially outward from the combustor basket 20 such that at least a portion of the stepped inlet ring 62 overlaps a portion of the combustor basket 20. The stepped inlet ring 62 may be formed from a radially extending, generally cylindrical collar 64 coupled to an axially extending cylindrical wall 66.

As shown in FIGS. 3-7, one or more heat shields 52 may be positioned downstream from a combustor basket 20 and proximate to an intersection between the collar 64 and the axially extending cylindrical wall 66. The heat shield 52 may be formed from a ring. The heat shield 52 may include a connection system 68, such as, but not limited to, one or a plurality of studs 70 extending from a downstream side of the heat shield 52 and in contact with the axially extending cylindrical wall 66. The studs 70 may extend through the stepped inlet ring 62. One or more of the studs 70 may have an orifice 72 extending therethrough. A bolt 74 may extend through the orifice 72 and may have a nut 76 attached to the bolt 74. The connection system 68 may be formed from one or more stops 78 attached to the collar 64 and extending radially inward therefrom. An upstream edge the heat shield 52 may contact the stop 78.

In an alternative embodiment, one or more heat shields 52 may be positioned downstream from an exhaust outlet 32 of the fuel gas supply channel 14. The heat shield 52 may be positioned downstream and partially or entirely radially outward from the exhaust outlet 32. An inner surface 80 of the combustor basket 20 may be positioned radially inward from an innermost point 82 of the heat shield 52. The innermost point 82 of the heat shield 52 may be positioned radially inward of an inner surface 84 of the transition section 22. As such, the relationship of the inner surface 84 of the transition section 22, the innermost point 82 of the heat shield 52, and the inner surface 80 of the combustor basket 20 forms an increasing diameter region moving downstream from the combustor basket 20 such that hot gases flowing through the combustor basket 20 do not collide with a component immediately downstream of the combustor basket 20. The configuration forms a cascade of components with an ever increasing diameter. In particular, a diameter of the inner surface 80 of the combustor basket 20 at the terminal end 26 is less than a diameter of the heat shield 52 at the innermost point 82, which is less than a diameter of the inner surface 84 of the transition section 22. The innermost point 82 of the heat shield 52 may be positioned radially outward of and downstream from the terminal end 26 of the combustor basket 20, and an inner surface 84 of the transition section 22 is positioned radially outward of and downstream from the innermost point 82 of the heat shield 52, thereby creating a cascade radially outward downstream of the terminal end 26 of the combustor basket 20.

The heat shield 52 may be used to modify combustion at the exhaust outlet 32. The heat shield 52 may have any appropriate configuration and may be formed from any appropriate material. In at least one embodiment, as shown in FIG. 2, the heat shield 52 may be generally linear and may extend circumferentially around part or all of the transition section 22. The heat shield 52 may include support surfaces 56 configured to bear against the transition section 22.

In at least one embodiment, the support surfaces 56 may be configured to contact the transition section 22 on surfaces generally orthogonal to each other. In particular, the heat shield 52 may contact the collar 64 and may contact the axially extending cylindrical wall 66 of the stepped inlet ring 62. The support surfaces 56 may be configured such that the heat shield 52 may expand or contract due to heating or cooling during turbine engine operation. Thus, in at least one embodiment, the heat shield may not be rigidly attached to the transition section 22 on both support surfaces 56. One or more metered cooling orifices 50 may be positioned in the heat shield 52, thereby supplying cooling air immediately downstream of the exhaust outlet 32 of the fuel gas supply channel 14. Metering orifices 50 may also be provided in the axially extending cylindrical wall 66 and the collar 64. One or more thermal barrier coatings 54 may be applied to the heat shield 52 and to other components, such as, but not limited to inner hot gas path surfaces of the combustor basket 20 and the transition section 22.

The fuel gas cooling system 10 shown in FIGS. 1-3 provides a method of reducing firing temperatures at the fuel stage nozzles by injecting fuel gas into the hot gas path at an intermediary position. Thus, the fuel gas cooling system 10 provides for intermediary fuel gas firing. The flow of fuel gas may be controlled in any appropriate manner, such as, but not limited to, valves. The fuel gas may be provided into the fuel gas supply conduit 38 and may flow into the fuel gas plenum 36. The fuel gas may then flow into each fuel gas supply channel 14 were the fuel cools the walls of the channel 14. Air flowing through the one or more air orifices 46 may be mixed with the fuel. The fuel then is exhausted through the exhaust outlets 32. The fuel is burned upon exiting the exhaust outlets 32. The fuel may be further controlled with metered cooling orifices 50 positioned in the wall forming the transition section 22 and in the heat shield 52. Burning fuel at this location and controlling the firing of the fuel in this manner enables the firing temperature at the fuel stage nozzles to be reduced and may reduce NOx emissions.

The foregoing is provided for purposes of illustrating, explaining, and describing embodiments of this invention. Modifications and adaptations to these embodiments will be apparent to those skilled in the art and may be made without departing from the scope or spirit of this invention or the following claims.

We claim:

1. A fuel gas cooling system for a combustion basket spring clip seal support, comprising:
   a combustor basket;
   at least one transition section that extends downstream from a downstream, terminal end of the combustor basket, wherein the at least one transition section upstream end is positioned upstream from the downstream, terminal end of the combustor basket such that at least a portion of the at least one transition section axially overlaps the combustor basket;
   at least one spring clip positioned between the combustor basket and the at least one transition section such that the at least one spring clip seals at least a portion of a circumferential gap between the combustor basket and the at least one transition section;
   at least one fuel gas supply channel having at least one exhaust orifice proximate to the terminal end of the combustor basket and downstream of the at least one spring clip;
   at least one fuel gas plenum coupled to the at least one fuel gas supply channel for supplying fuel gas to the at least one fuel gas supply channel; and
   wherein the at least one fuel gas supply channel comprises an axially extending plenum positioned radially between the at least one spring clip and the combustor basket.

2. The fuel gas cooling system of claim 1, wherein the at least one fuel gas plenum is a circumferential plenum.

3. The fuel gas cooling system of claim 1, further comprising at least one fuel gas supply conduit in fluid communication with the at least one fuel gas plenum.

4. The fuel gas cooling system of claim 1, further comprising at least one cooling fluid supply channel having at least one exhaust orifice proximate to the terminal end of the combustor basket.

5. The fuel gas cooling system of claim 4, wherein the at least one cooling fluid supply channel and the at least one fuel gas supply channel each comprise a plurality of channels positioned such that the channels are positioned circumferentially and in alternating order around the terminal end of the combustor basket.

6. The fuel gas cooling system of claim 1, further comprising at least one air orifice in a wall forming the at least one fuel gas supply channel for supplying air to the fuel gas flowing through the at least one fuel gas supply channel.

7. The fuel gas cooling system of claim 6, wherein the at least one air orifice comprises a plurality of air orifices positioned in a wall of the at least one fuel gas supply channel, wherein the at least one fuel gas supply channel comprises an axially extending supply channel positioned radially between the at least one spring clip and the combustor basket.

8. The fuel gas cooling system of claim 1, further comprising at least one metered cooling orifice supplying cooling air immediately downstream of an exhaust outlet of the at least one fuel gas supply channel.

9. The fuel gas cooling system of claim 1, further comprising at least one heat shield positioned downstream from an exhaust outlet of the at least one fuel gas supply channel, wherein the heat shield modifies combustion at the exhaust outlet.

10. The fuel gas cooling system of claim 9, further comprising at least one metered cooling orifice in the at least one heat shield supplying cooling air immediately downstream of the exhaust outlet of the at least one fuel gas supply channel.

11. The fuel gas cooling system of claim 9, further comprising at least one thermal barrier coating on the at least one heat shield.

12. A fuel gas cooling system for a combustion basket spring clip seal support, comprising:
    a combustor basket;
    at least one transition section that extends from a downstream, terminal end of the combustor basket, wherein the at least one transition section upstream end is positioned upstream from the downstream, terminal end of the combustor basket such that at least a portion of the at least one transition section axially overlaps the combustor basket;
    at least one spring clip positioned between the combustor basket and the at least one transition section such that the at least one spring clip seals at least a portion of a circumferential gap between the combustor basket and the at least one transition section;
    at least one fuel gas supply channel having at least one exhaust orifice proximate to the terminal end of the combustor basket;
    at least one fuel gas plenum coupled to the at least one fuel gas channel for supplying fuel gas to the at least one fuel gas supply channel;
    wherein the at least one fuel gas plenum is a circumferential plenum; and
    wherein the at least one fuel gas supply channel comprises an axially extending plenum positioned radially between the at least one spring clip and the combustor basket; and
    at least one fuel gas supply conduit in fluid communication with the at least one fuel as plenum.

13. The fuel gas cooling system of claim 12, further comprising at least one cooling fluid supply channel having at least one exhaust outlet proximate to the terminal end of the combustor basket and downstream of the at least one spring clip.

14. The fuel gas cooling system of claim 12, further comprising at least one air orifice in a wall forming the at least one fuel gas supply channel for supplying air to the fuel gas flowing through the at least one fuel gas supply channel and further comprising at least one metered cooling orifice supplying cooling air immediately downstream of the exhaust outlet of the at least one fuel gas supply channel.

15. The fuel gas cooling system of claim 12, further comprising at least one heat shield positioned downstream from the exhaust outlet of the at least one fuel gas supply channel, wherein the heat shield modifies combustion at the exhaust outlet.

16. The fuel gas cooling system of claim 15, further comprising at least one metered cooling orifice in the at least one heat shield supplying cooling air immediately downstream of the exhaust outlet of the at least one fuel gas supply channel.

17. A fuel gas cooling system for a combustion basket spring clip seal support, comprising:
  a combustor basket;
  at least one transition section that extends from a downstream, terminal end of the combustor basket, wherein the at least one transition section upstream end is positioned upstream from the downstream, terminal end of the combustor basket such that at least a portion of the at least one transition section overlaps the combustor basket;
  at least one spring clip positioned between the combustor basket and the at least one transition section such that the at least one spring clip seals at least a portion of a gap between the combustor basket and the at least one transition section;
  at least one fuel gas supply channel having at least one exhaust orifice proximate to the terminal end of the combustor basket; and
  at least one fuel gas plenum coupled to the at least one fuel gas channel for supplying fuel gas to the at least one fuel gas supply channel;
  wherein the at least one fuel gas supply channel comprises an axially extending plenum positioned radially between the at least one spring clip and the combustor basket;
  at least one fuel gas supply conduit in fluid communication with the at least one fuel gas supply channel;
  at least one air orifice in a wall forming the at least one fuel gas supply channel for supplying air to the fuel gas flowing through the at least one fuel gas supply channel;
  at least one metered cooling orifice supplying cooling air immediately downstream of an exhaust outlet of the at least one fuel gas supply channel; and
  at least one heat shield positioned downstream from an exhaust outlet of the at least one fuel gas supply channel, wherein the heat shield modifies combustion at the exhaust outlet.

18. The fuel gas cooling system of claim 17, further comprising at least one metered cooling orifice in the at least one heat shield supplying cooling air immediately downstream of the exhaust outlet of the at least one fuel gas supply channel.

* * * * *